United States Patent [19]

Nalbandyan et al.

[11] Patent Number: 4,569,534

[45] Date of Patent: Feb. 11, 1986

[54] PASSENGER RESTRAINT SYSTEM

[76] Inventors: Nikolaes A. Nalbandyan; Grigor A. Nalbandyan; Harutyun G. Nalbandyan, all of 4421 Melbourne Ave., Apt. #5, Los Angeles, Calif. 90027

[21] Appl. No.: 621,843

[22] Filed: Jun. 18, 1984

[51] Int. Cl.⁴ .............................................. B60R 21/10
[52] U.S. Cl. .................................. 280/742; 180/274; 297/403; 297/464
[58] Field of Search .............. 280/748, 749, 801, 802; 297/403, 408, 464, 468, 469, 481; 180/274

[56] References Cited

U.S. PATENT DOCUMENTS

| 3,692,327 | 9/1972 | Barrick, Sr. et al. | 280/749 |
| 3,695,629 | 10/1972 | Schlanger | 280/749 |
| 3,782,756 | 1/1974 | Brown | 280/749 |
| 3,804,430 | 4/1974 | Fiala et al. | 280/749 |
| 4,411,334 | 10/1983 | Schlanger | 180/274 |

FOREIGN PATENT DOCUMENTS

| 263058 | 6/1912 | Fed. Rep. of Germany | 180/274 |
| 3131633 | 2/1983 | Fed. Rep. of Germany | 297/403 |

Primary Examiner—Joseph F. Peters, Jr.
Assistant Examiner—Kenneth R. Rice
Attorney, Agent, or Firm—Fulwider, Patton, Rieber, Lee & Utecht

[57] ABSTRACT

A passenger restraint system is provided for restraining passengers within seats of an automotive vehicle or the like during a collision. The impact of a collision at a front bumper of the vehicle displaces a plunger to draw upon an actuation cable attached thereto, wherein the cable extends rearwardly to a position above passenger seats and underlying the vehicle roof where it is stretched tight by a spring. Slide actuators move with the cable upon impact to displace hinged frames carrying flexible sheetlike passenger restraints from a normal out-of-the-way position generally at the vehicle roofline to a restraining position descended in front passengers to restrain the passengers within their seats. A cable stop mechanism locks the system in the restraining position and is manually releasable whereupon the cable spring returns the system to the normal position ready for reuse. A similar restraint system including a second cable and plunger may be provided in association with the rear bumper to activate, for example, rear seat headrests to provide rear-end collision protection for rear seat passengers.

15 Claims, 19 Drawing Figures

PASSENGER RESTRAINT SYSTEM

BACKGROUND OF THE INVENTION

This invention relates generally to safety equipment for use in automotive vehicles and the like. More particularly, this invention relates to a relatively simple and inexpensive yet effective passenger restraint system for protecting passengers of an automotive vehicle from injury during a collision.

Attempts to protect passengers of automotive vehicles and the like against serious injury during a collision have resulted in the design of numerous devices and systems ranging from improvements in vehicular structures to collision-activated equipment, such as air bags. More specifically, by way of example, modern automotive vehicles generally include a minimum number of protrusions within a passenger compartment, together with a high degree of padding at appropriate locations, such as the dashboard. Modern vehicles further include additional safety devices, such as so-called safety glass, collapsible steering columns, and the like to further protect passengers against injuries.

Perhaps the most important and effective type of safety equipment for protecting vehicle passengers during collisions comprises restraining devices for restraining passengers within their seats to avoid secondary collisions between the passengers and interior portions of the vehicle and to prevent the passengers from being thrown from the vehicle. In this regard, lap and shoulder seat belts are generally provided as standard equipment with most modern automotive vehicles and have proven highly effective in protecting passengers against injuries. The major disadvantage of such seat belts, however, is that they normally require active passenger participation to buckle or otherwise fasten the belts prior to a collision. Unfortunately, the reluctance of many persons to take the relatively simple step of fastening a seat belt results in many otherwise avoidable collision injuries.

Passive restraining devices have also been developed which do not require active passenger participation for activation. For example, combination lap and shoulder seat belts have been designed for activation appropriately by opening and closing of vehicle doors, or by electrical devices coupled to the vehicle ignition system or by other automated means. However, automatic seat belts of this type are generally considered somewhat cumbersome and unsightly and thus have not gained any significant comsumer acceptance.

More complicated and costly passive restraint systems have been developed, such as those including normally deflated air bags hidden within the steering wheel or dashboard of a vehicle and adapted for rapid inflation in response to a collision, thereby providing a cushioned barrier restraining front seat passengers within their seats. Once activated, however, these protective air bags generally must be replaced. Unfortunately, the original installation and replacement of such air bags can be relatively costly, whereby protective air bags generally are not preferred by many consumers and are presently unavailable in most vehicles. Moreover, on vehicles currently providing protective air bag equipment, the air bags are generally used only to protect the driver and/or other front seat passengers without providing any protection for passengers within rear seats of the vehicle.

Accordingly, there exists a significant need for a relatively inexpensive and reliable passive passenger restraint system designed for effectively protecting both front and rear seat passengers of an automotive vehicle and further which can be quickly and easily reset for reuse. The present invention fulfills these needs and provides further related advantages.

SUMMARY OF THE INVENTION

The present invention provides a passive passenger restraint system activated during a collision of an automotive vehicle or the like to protect vehicle passengers against serious injury. The system is activated during a collision by a spring-loaded actuation cable coupled generally between, for example, a front vehicle bumper and one or more hinged frames each incorporated into the vehicle roofline above passenger seats and carrying a flexible sheetlike passenger restraint of fabric, netting, or the like. The cable transmits an impact signal to the hinged frame which descends to a restraining position supporting the flexible passenger restraint in front of the vehicle passengers thereby holding the passengers in their seats during the collision.

In one preferred form of the invention, a front end of the actuation cable is connected to a spring-loaded plunger incorporated into a front bumper assembly of the type commonly retractable rearwardly in response to a front end collision to eliminate or reduce collision damage to the vehicle. From the plunger, the cable extends rearwardly and upwardly to a position above the passenger seats underlying the vehicle roof for connection of the rear end of the cable to a cable tension spring. A collision force applied to the vehicle front bumper assembly displaces the plunger in a direction drawing upon the actuation cable against the tension force applied by the cable spring, whereby the cable movement constitutes an impact signal transmitted to the vehicle roofline.

The hinged frames are normally provided in a number corresponding with and installed at respective positions overlying the vehicle seats, with two hinged frames being normally provided to overlie, for example, the front and rear seats of the vehicle. Each hinged frame comprises a pair of stationary hinge arms secured to the vehicle roof at opposite lateral sides thereof and associated with a corresponding pair of movable hinge arms adapted for movement between normal out-of-the-way positions generally at the vehicle roofline and downwardly pivoted restraining positions. The movable hinge arms at the opposite lateral sides of the vehicle roof support the flexible sheetlike passenger restraint for movement to the restraining position descended in front of vehicle passengers.

Each hinged frame is operated by a slide actuator mounted on and movable with the actuation cable in response to a collision. This slide actuator and the associated hinged frame include interengageable cam means for displacing the movable hinge arms from the normal position in a downward direction to the restraining position in response to a collision force exceeding a predetermined magnitude.

A cable stop mechanism is provided along the length of the actuation cable for releasably retaining the system, including the cable, hinged frame, and flexible passenger restraint, in the restraining position. In one preferred form, this cable stop mechanism comprises a stop member secured onto the actuation cable for movement therewith into locked engagement with a spring-loaded lock arm mounted at a selected position on the vehicle. With the passenger restraint in the restraining position, the lock arm prevents return movement of the stop member and the cable under the influence of the cable tension spring to the normal position, thereby retaining the passenger restraint in the descended restraining position. However, the lock arm is positioned for easy access by the vehicle driver or other passenger and may be lifted from locked engagemet with the stop member thereby permitting spring-loaded return of the system components to the normal position ready for reuse.

A similar secondary passenger restraint system may be provided to protect passengers, particularly rear seat passengers, against injury from rear-end collisions. In a secondary passenger restraint system, a secondary actuation cable is coupled between a spring-loaded plunger at a rear vehicle bumper and a secondary cable tension spring secured in turn to an appropriate point on the vehicle. This secondary actuation cable carries a slide actuator interengageable with a hinged headrest frame to displace one or more headrests from a normal out-of-the-way position to upright restraining positions behind rear seat passengers in the event of a collision.

Other features and advantages of the present invention will become more apparent from the following detailed description, taken in conjunction with the accompanying drawings, which illustrate by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figures 1, 2, 3:
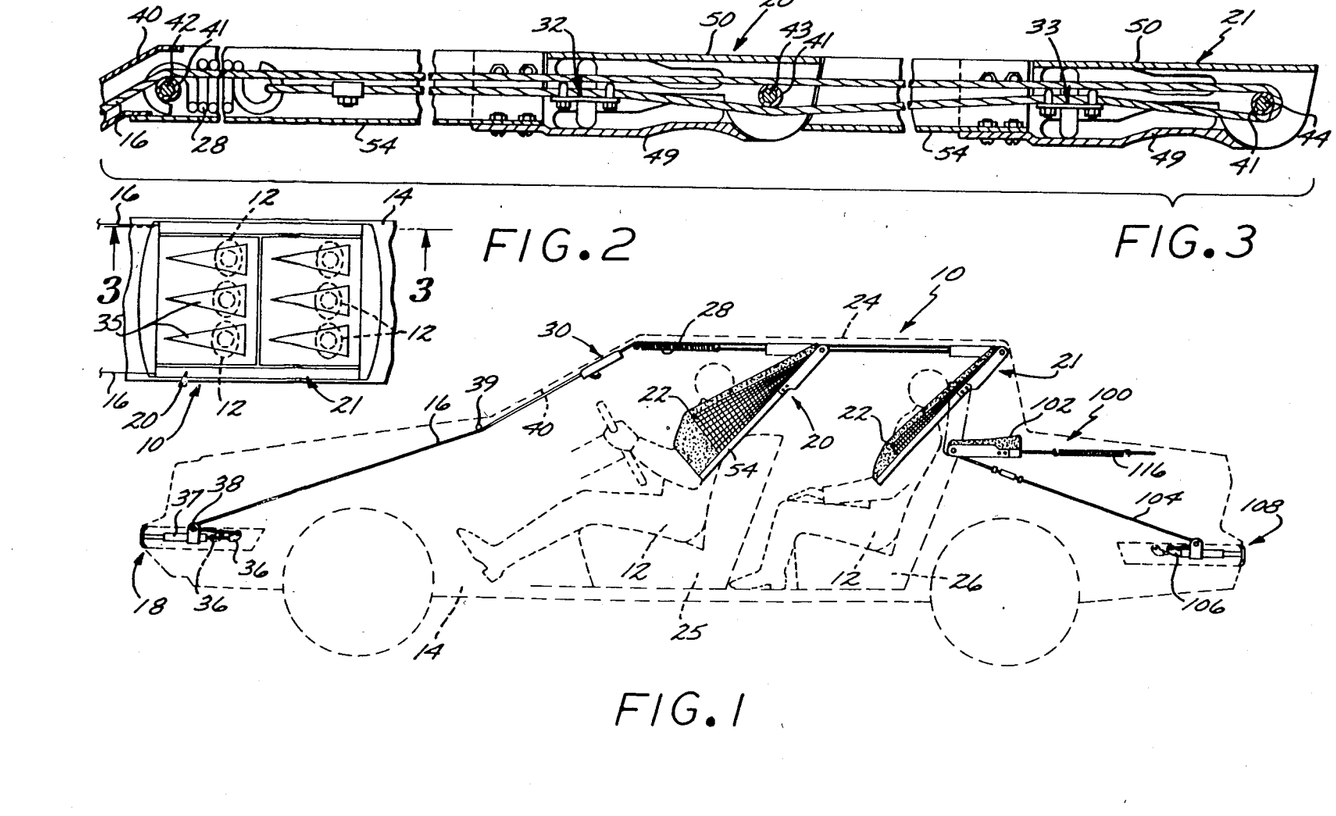
FIG. 1 is a somewhat schematic side elevation of a passenger restraint system embodying the novel features of the invention and shown in a restraining position superimposed upon the shadow outline of an automotive vehicle and passengers seated therein.
FIG. 2 is a schematic plan view illustrating the passenger restraint system including a pair of flexible passenger restraints for respective protection of front seat and rear seat passengers within a vehicle.
FIG. 3 is an enlarged fragmented side elevation view of a portion of the passenger restraint system taken generally on the line 3—3 of FIG. 2 and illustrating the system in a normal out-of-the-way position.

As shown in the exemplary drawings, a passenger restraint system referred to generally by the reference numeral 10 in FIG. 1 is provided for protecting passengers 12 seated within an automotive vehicle 14 or the like against serious injury upon occurrence of a collision. The restraint system 10 comprises at least one spring-biased actuation cable 16 for transmitting a collision from, for example, a front bumper assembly 18 of the vehicle to hinged frames 20 and 21 to swing flexible passenger restraints 22 from a normal out-of-the-way position closely underlying the vehicle roof 24 to a descended restraining position in front of the passengers 12, thereby safely retaining the passengers within their seats during a collision.

The passenger restraint system 10 of the present invention provides a relatively simple, economical, yet highly reliable apparatus for protecting passengers of an automotive vehicle against injury incident to a collision. The system 10 comprises a relatively small number of simple mechanical components designed for collision-actuated movement from a normal position which does not interfere with passenger vision or normal vehicle use to a descended restraining position entrapping vehicle passengers 12 securely within the appropriate front seat 25 or rear seat 26 of the vehicle. Accordingly, the restraint system 10 is passive in nature without requiring activation or engagement by the vehicle driver or by any other passenger. However, subsequent to operation incident to a collision, the restraint system 10 of the present invention is designed for rapid and simple restoration to the normal position ready for reuse in the event of a subsequent collision.

The passenger restraint system 10 of the present invention is illustrated in one preferred form in FIGS. 1-9. As shown, in general terms, the restraint system 10 comprises the spring-biased actuation cable 16 connected between the front bumper assembly 18 of the vehicle and a cable tension spring 28 installed generally at the vehicle roofline along one lateral side thereof, and thus above a side window (not shown) of the vehicle. The actuation cable 16 carries a pair of slide actuators 32 and 33 (FIG. 3) for respective interengagement with the hinged frame 20 overlying the vehicle front seat 25 and the hinged frame 21 overlying the vehicle rear seat 26. These hinged frames 20 and 21 respectively support a pair of the flexible sheetlike passenger restraints 22 for swinging movement between the normal position lying substantially flush with the vehicle roof 24 to the descended restraining positions, as viewed in FIG. 1. When a collision of sufficient magnitude occurs, as will be explained herein in more detail, the passenger restraints 22 are moved rapidly to their restraining positions and a cable stop mechanism 30 releasably retains the entire system in the restraining position to prevent immediate spring-biased return movement of the actuation cable and other system components back to the normal position. However, the cable stop mechanism 30 may be released by the vehicle driver or other passenger to permit spring-biased return of the system components to the normal position ready for reuse in the event of a subsequent collision.

As shown diagramatically in FIG. 2, the restraint system 10 preferably includes a pair of the spring-biased actuation cables 16 connected respectively to opposite lateral ends of the front bumper assembly 18 and extending therefrom along opposite lateral sides of the vehicle 14, typically hidden within appropriate panel or structural components of the vehicle. The two cables 16 extend upwardly and rearwardly to opposite lateral sides of the hinged frames 20 and 21, and each cable includes the pair of the slide actuators 32 and 33 for respective cooperation with sets of hinge arms at the opposite lateral sides of the vehicle roof 24. The passenger restraints 22 are supported and stretched between the sets of hinge arms and thus define, in the normal position, a flexible headliner for the passenger compartment selected from an appropriate high-strength yet decorative fabric or netting material. As depicted in FIG. 2, each of these passenger restraints 22 may include appropriate shaped cushioned regions 35 of a foam padding or the like positioned to engage the underlying head of a passenger 12 when the system is moved to the restraining position (FIG. 1). Alternatively, a single actuation cable 16 may be used, with the sets of hinge arms at the opposite sides of each frame 20 and 21 interconnected transversely for simultaneous movement in response to collision-actuated movement of the cable 16.

With reference to FIG. 1, the actuation cable 16 has a forward end connected in any suitable manner to the rear end of a plunger 36 forming a portion of the front bumper assembly 18. More particularly, this plunger 36 is supported within an appropriate plunger retainer 37 for sliding movement in a fore-aft direction with respect to the vehicle 14 and subjected to a biasing force applied by a plunger spring (not shown) or the like urging the plunger toward a forward position illustrated in dotted lines in FIG. 1. When a collision occurs at the front end of the vehicle, the front bumper assembly 18 is retracted rearwardly to correspondingly displace the plunger 36 in a rearward direction toward the solid line position in FIG. 1, thereby drawing upon the front end of the actuation cable 16. In this regard, the front bumper assembly 18 is normally of the type for retractably absorbing minor collision forces without significant damage to the vehicle, with the plunger 36 being provided as a portion of the bumper assembly. However, the plunger 36 and associated retainer 37 may be provided as separate components, if desired.

From the rear end of the plunger 36, the actuation cable 16 is wrapped about a small pulley 38 positioned in front of the plunger rear end after which the cable extends rearwardly and upwardly through appropriate structrual and/or decorative panel components of the vehicle to a position beneath the vehicle roof 24. More particularly, in the illustrative embodiment depicted in FIG. 1, the cable 16 extends upwardly and rearwardly beneath a cable guide 39 generally at one lower side margin of the vehicle windshield and then upwardly through a windshield side pillar 40. As shown best in FIG. 3, the cable 16 exits the upper end of the pillar 40 and extends rearwardly over roller sleeves 41 carried by an anchor pin 42 at the upper end of the pillar 40 and by hinge pins 43 and 44 for the hinged frames 20 and 21, respectively. The cable 16 is wrapped around the rear side of the hinge pin 44 and then passed beneath the other hinge pin 43 for connection of the rear end of the cable to the cable tension spring 28 which is supported in turn by the anchor pin 42. When the restraint system 10 is in the normal position, as viewed in FIG. 3, this cable tension spring 28 applies a predetermined tension force upon the cable 16, wherein this tension force maintains the various system components in the normal position ready for use in the event of a vehicle collision.

When a front end collision occurs, a collision force applied to the front bumper assembly 18 displaces the plunger 36 in a rearward direction thereby drawing upon the front end of the actuation cable and further elongating the cable tension spring 28. This cable drawing movement causes a rearwardly directed displacement of the rear end of the cable connected to the spring 28 and extending therefrom to the rearmost hinge pin 44. This rearward cable displacement constitutes a collision impact signal and is transmitted by the slide actuators 32 and 33 to the hinged frames 20 and 21, respectively, to displace the passenger restraints 22 to the restraining positions.

More particularly, the slide actuator 32 and its operative interengagement with the hinged frame 20 is shown in detail in FIGS. 4-8, with the other slide actuator 33 and associated hinged frame 21 being of generally identical construction. As shown, each slide actuator comprises a clamp plate 45 fixed to the cable 16 at a selected point by a pair of U-bolt fasteners 46 which clamp the cable 16 tightly onto the clamp plate 45. The clamp plate 45 carries at its opposite lateral sides a pair of vertically oriented cam arms 55 wherein each cam arm supports an upper relatively short cam roller 47 and a lower comparatively longer cam roller 48.

Figure 4:
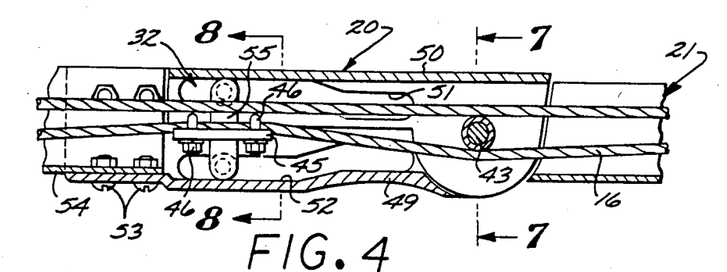
FIG. 4 is a further enlarged fragmented vertical sectional view of a portion of the restraint system and illustrating construction details of an actuation cable carrying a slide actuator for engagement with a hinged frame.
Figure 5:
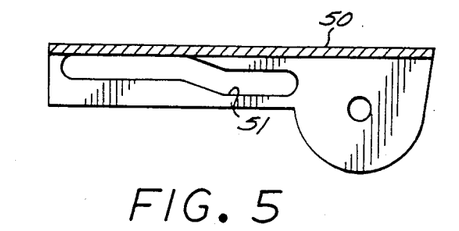
FIG. 5 is a vertical sectional view of an upper stationary hinge arm forming a portion of the hinged frame of FIG. 4.
Figure 6:
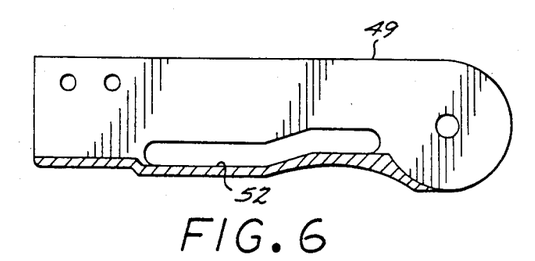
FIG. 6 is a vertical sectional view of a lower movable hinge arm forming a portion of the hinged frame of FIG. 4.
Figure 7:
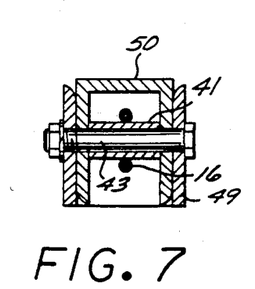
FIG. 7 is a transverse vertical sectional view taken generally on the line 7—7 of FIG. 4.
Figure 8:
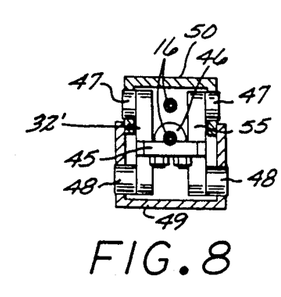
FIG. 8 is a transverse vertical sectional view taken generally on the line 8—8 of FIG. 4.

The slide actuator 32 as described above is carried by the cable in a position generally between a downwardly open, generally U-shaped upper stationary hinge arm 50 secured appropriately to the vehicle roof 24 and an upwardly open, generally U-shaped lower movable hinge arm 49 pivotally connected to the stationary arm 50 by the associated hinge pin 43. The upper cam rollers 47 of the slide actuator project laterally into longitudinally extending open cam slots 51 in the vertical sidewalls of the stationary arm 50, whereas the lower cam rollers project laterally into longitudinally open cam slots 52 formed in the vertical sidewalls of the movable hinge arm 49.

Rearward pulling movement on the rear end of the actuation cable 16, as occurs incident to a front bumper collision, displaces the slide actuator 32 in a rearward direction along with the cable 16 thereby displacing the cam rollers 47 and 48 in a rearward direction within the respective cam slots 51 and 52. In the preferred form of the invention, these cam slots 51 and 52 include forward regions generally horizontal and parallel to each other to permit a minor degree of cable/slide actuator movement during, for example, a minor collision, without displacing the lower movable hinge arm 49 toward the restraining position. However, collision forces of a predetermined sufficient magnitude displace the slide actuator 32 toward rearwardly converging central regions of the cam slots 51 and 52 resulting in downward pivoting displacement of the movable hinge arm 49 with respect to the upper stationary arm 50. The shapes of these cam slots are chosen such that this downward pivoting hinge arm movement occurs rapidly and substantially completely to the restraining position within a relatively short stroke of slide actuator movement.

The forwardmost end of the lower hinge arm 49 is connected by suitable fasteners 53 to an extension arm 54 to which one lateral side of the associated flexible passenger restraint 22 is secured in any suitable manner. Accordingly, the downward pivoting hinge arm 49 correspondingly swings the extension arm 54 in a downward direction toward the restraining position (FIG. 1) to restrain passengers 12 in their seats during a collision. This downward swinging movement is accompanied, of course, by similar actuation of an identical set of hinge arms at the opposite lateral side of the vehicle roof 24 to safely entrap passengers within the front seat 25 protected against injury. The rear hinged frame 21 includes similar laterally opposed sets of hinge arms actuated by the rear slide actuator 33 for displacement to the restraining position to safeguard rear seat passengers against injury.

Figure 9:
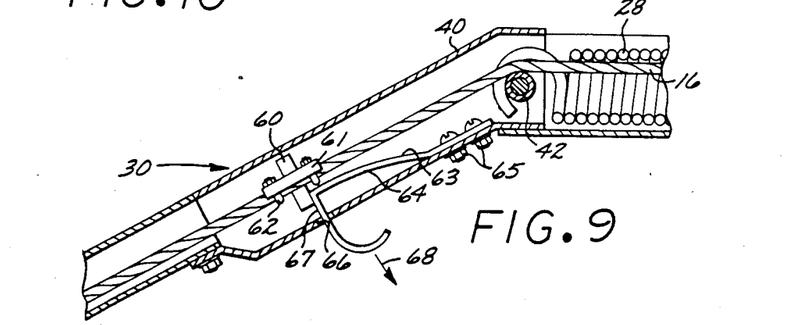
FIG. 9 is an enlarged fragmented vertical sectional view through another portion of the passenger restraint system of FIG. 1 and illustrating construction details of a cable stop mechanism for releasably retaining the restraint system in the restraining position.

The cable stop mechanism 30 is shown in detail in FIG. 9 and functions to releasably retain the restraints 22 in their restraining positions. More particularly, in the illustrative form, this cable stop mechanism 30 is incorporated into the windshield side pillar 40 and includes a platelike stop member 60 secured onto the cable 16 for movement therewith by means of a clamping plate 61 and clamping U-bolts 62 or the like. In the normal position of the restraint system 10, as viewed in dotted lines in FIG. 9, the stop member 60 is disposed at the base of an inclined ramp 63 defined by a springable lock arm 64 having one end fastened to the vehicle by fasteners 65 or the like. The other end of this lock arm 64 protrudes through a small opening 66 in the pillar 40 a short distance into the passenger compartment for easy manual grasping by the vehicle driver or other passenger.

When a collision occurs, collision-actuated cable displacement draws the stop member 60 over the inclined ramp 63 to the solid line position in FIG. 9 prevented against spring-biased return movement to the normal position by engagement with a stop face 67 on the lock arm 64. Accordingly, the lock arm retains the stop member 60 together with the cable 16 and all other system components in the restraining positions illustrated in FIG. 1. When desired, however, the lock arm 64 can be drawn by the vehicle driver or the like in the direction of arrow 68 in FIG. 9 to disengage the stop member 60, thereby permitting the cable tension spring 28 to return the entire restraint system to the initial normal position ready for reuse in the event of a subsequent collision.

Accordingly, the passenger restraint system 10 depicted in FIGS. 1-9 provides a relatively simple and thus relatively inexpensive yet reliable mechanical arrangement for moving flexible passenger restraints 22 to restraining positions in response to a front bumper collision. The cable stop mechanism 30 retains the entire position in this restraining position but is easily released to permit spring-loaded restoration of the entire system to the initial normal position.

The above-described passenger restraint system 10 may be used advantageously in combination with a secondary restraint system 100 for elevating pivoting headrests 102 to elevated restraining positions in the event of a rear bumper collision. These headrests 102 are generally provided to protect rear seat passengers against head and neck injuries common to rear-end collisions, since protective headrests are normally omitted from the rear seat of modern automotive vehicles to avoid undue obstruction of driver vision. However, in certain vehicles, these pivoting headrests 102 may be used additionally to protect front seat passengers or they may be used in vehicles having only a front seat but otherwise not equipped with protective head-rests.

Figure 10:
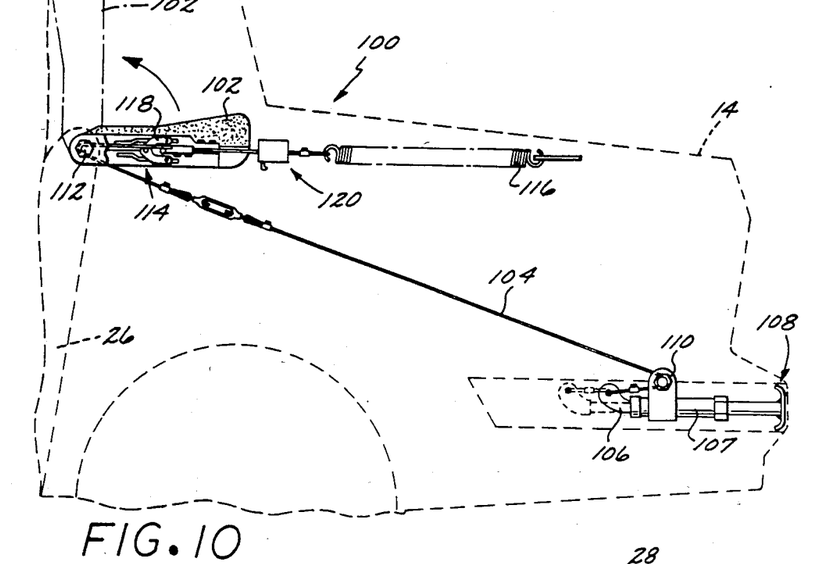
FIG. 10 is a somewhat schematic enlarged side elevation view of a secondary passenger restraint system for protecting rear seat passengers against injury from rear-end collision.

This secondary restraint system 100 is shown generally in FIG. 10 to include a number of structural and operative components corresponding generally with those described previously with respect to the restraint system shown in FIGS. 1-9. More particularly, the secondary restraint system 100 includes a secondary actuation cable 104 having a rear end secured to a plunger 106 supported for longitudinal sliding movement within a retainer 107 and spring-biased rearwardly as a portion of a rear bumper assembly 108. The cable 104 is looped rearwardly over a small pulley 110 and then extends upwardly and forwardly where it is looped about a headrest pivot 112. From the headrest pivot 112, the cable 104 extends through a hinged frame 114 and ultimately has a forwardmost end secured to a tension spring 116 anchored in turn to the vehicle.

The secondary actuation cable 104 is thus drawn upon by the plunger 106 in the event of a rear bumper collision to provide an impact signal transmitted to the hinged frame 114. Similar to the previously described embodiment, this signal transmission occurs via a slide actuator 118 carried by the cable and including cam means similar to that described with respect to FIG. 8 for pivoting the headrest 102 upwardly to the dotted line position in FIG. 10 in the event of a rear bumper collision. A cable stop mechanism 120 which may be located, for example, in the vehicle trunk, is provided to releasably retain the secondary system 100 in the restraining position when a rear bumper collision of predetermined magnitude occurs, and this stop mechanis 120 is adapted for rapid manual release to permit spring-biased restoration of the entire system 100 to the initial normal position.

As shown in FIGS. 11-18, a variety of modifications to the previously described restraint system 10 are possible without departing from the overall concept and operation of the invention. More particularly, FIGS. 11-18 illustrate an alternative form 10' of the restraint system wherein structural components analogous with those described in FIGS. 1–9 are designated by common primed reference numerals.

More particularly, the alternative embodiment depicted in FIGS. 10–18 includes an actuator cable 16' having a front end secured to a plunger 36' provided as a portion of a front bumper assembly 18' for an automotive vehicle 14' or the like. From the plunger 36', the cable 16' is wrapped forwardly over a small pulley 38' and then extends rearwardly along one lateral side of the vehicle to a position behind the rear seat 26'. The cable 16' then extends upwardly about a cable guide 39' to one lateral side of the vehicle roof whereat the cable is wrapped over a rear hinge pin 44' and extends forwardly beneath the roof 24' for connection to a cable tension spring 28' having an opposite end anchored in any suitable manner to the vehicle.

The actuator cable 16' carries a pair of modified slide actuators 32' and 33' for respective operative engagement with a hinged frame 20' overlying the vehicle front seat 25' and a hinged frame 21' overlying the vehicle rear seat 26'. These hinge frames 20' and 21' each include at each lateral side of the vehicle an upper stationary hinge arm 50' and a lower pivotally movable hinge arm 49' wherein the hinge arms 49' carry flexible sheetlike passenger restraints 22'.

The modified slide actuator 32' and its associated hinged frame 20' is shown in more detail in FIGS. 13–18, with the rear actuator 33' and hinge frame 21' generally identical thereto. As shown, the slide actuator 32' comprises a clamping plate 45' onto which the cable 16' is rigidly secured by U-bolts 46' or the like. One end of this clamping plate is connected to a transverse pivot pin 121 supporting upper and lower rearwardly angled links 122 and 123 which are connected in turn by additional pivot pins 124 and 125, respectively, to upper and lower guide links 126 and 127 having forward extension coupled to each other by an additional transverse pin 128. The upper guide links 126 carry outwardly projecting cam rollers 47' projecting into cam grooves 51' in the upper hinge arm 50' whereas the lower guide links 127 carry outwardly projecting cam rollers 48' received into cam grooves 52' of the lower movable hinge arm 49'.

Figure 11:
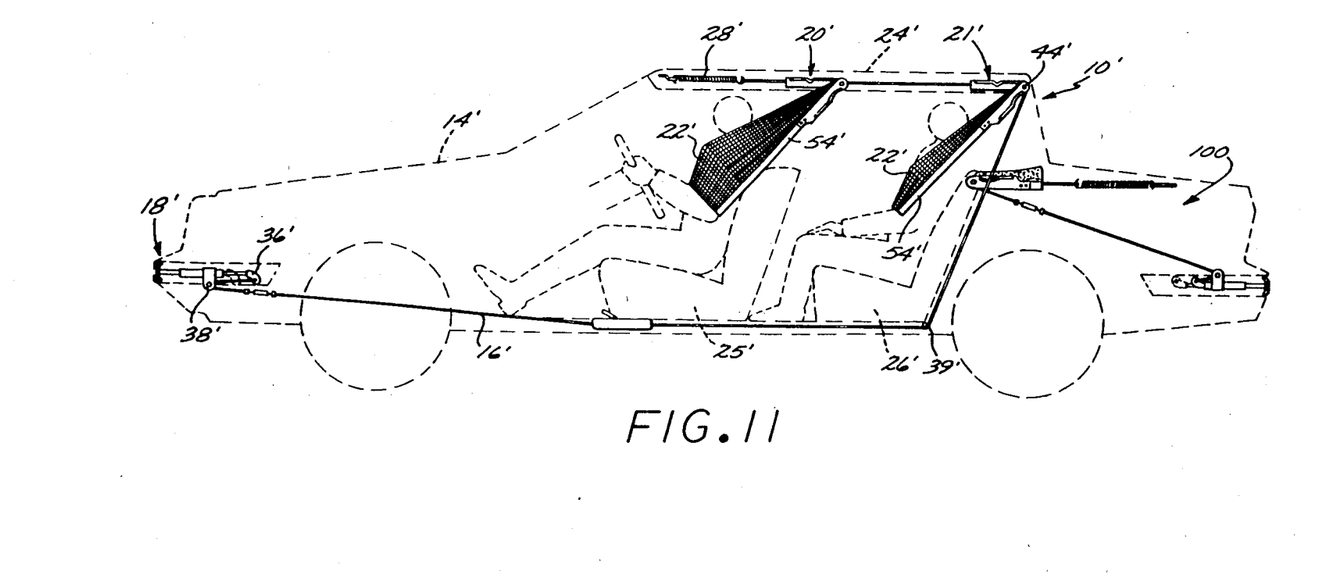
FIG. 11 is a somewhat schematic side elevation view of an alternative form of the passenger restraint system, depicted in superimposed relation over the shadow outline of an automotive vehicle and passengers seated therein and shown in a restraining position.
Figure 12:
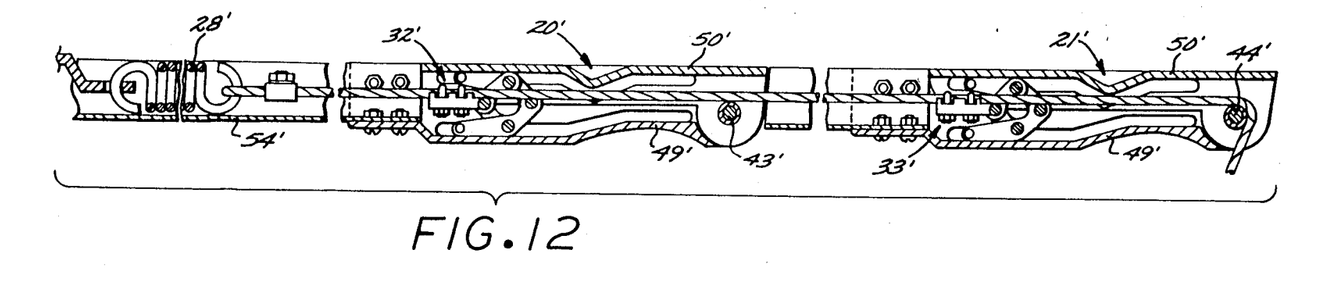
FIG. 12 is an enlarged fragmented vertical sectional view through an upper portion of the passenger restraint system of FIG. 11 and illustrating the system in a normal out-of-the-way position.
Figure 13:
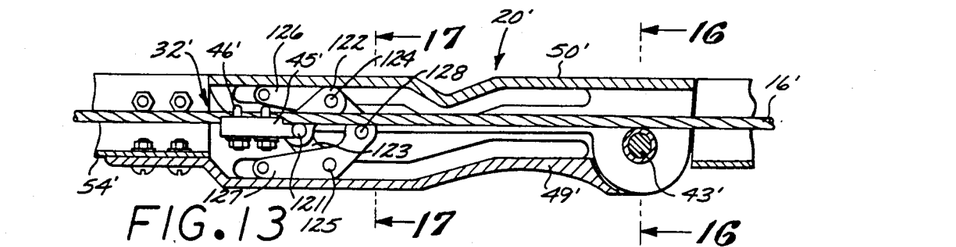
FIG. 13 is a further enlarged fragmented vertical sectional view of a portion of the restraint system shown in FIG. 12 and illustrating an actuation cable carrying a slide actuator in engagement with a hinged frame.
Figure 14:
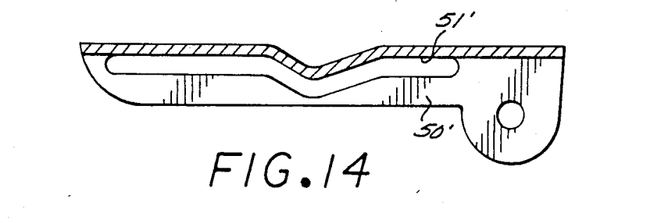
FIG. 14 is a vertical sectional view of an upper stationary hinge arm forming a portion of the hinged frame of FIG. 13.
Figure 15:
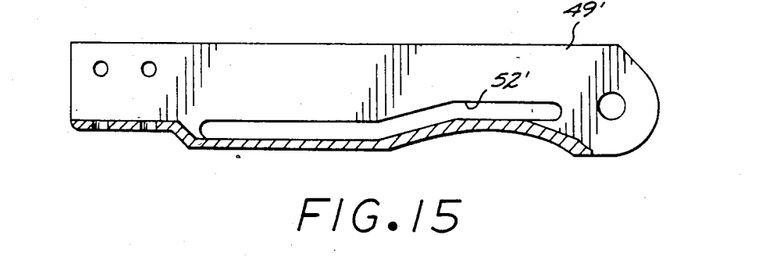
FIG. 15 is a vertical sectional view of a movable hinge arm forming a portion of the hinged frame of FIG. 13.
Figure 16:
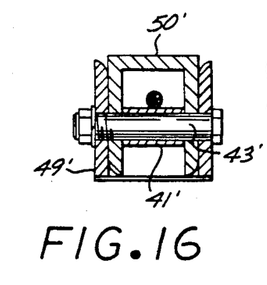
FIG. 16 is a transverse vertical sectional view taken generally on the line 16—16 of FIG. 13.
Figure 17:
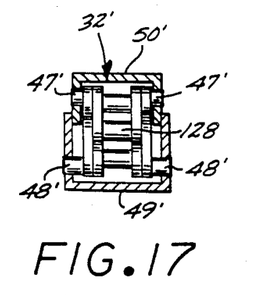
FIG. 17 is a transverse vertical sectional view taken generally on the line 17—17 of FIG. 13.
Figure 18:
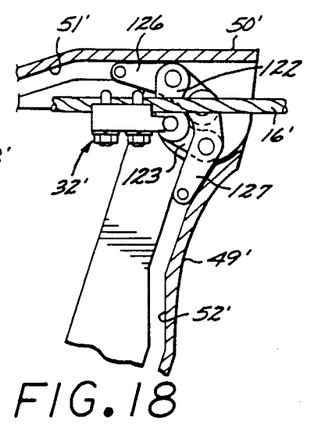
FIG. 18 is an enlarged fragmented vertical sectional view generally similar to a portion of FIG. 13 and illustrating the slide actuator and hinged frame in a restraining position.

The cam slots 51' and 52' in the hinge arms are shaped generally as described above with respect to FIGS. 4–6 for pivoting the lower hinge arms 49' downwardly to descended restraining positions, as viewed in FIG. 11, in response to collision actuated drawing upon the cable 16'. Such downward pivoting motion of the lower hinge arms 49' carries forward extension arms 54' which in turn support the flexible passenger restraints 22'.

Figure 19:
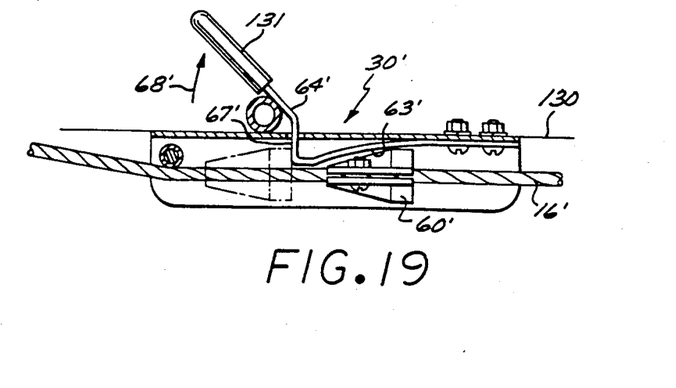
FIG. 19 is an enlarged fragmented side elevation view of a cable stop mechanism for use with the restraint system of FIG. 11.

As shown in FIG. 19, a modified cable stop mechanism 30' is provided for use with the alternative system 10' to releasably retain the system in the descended restraining position during a collision. This modified cable stop mechanism 30' comprises a wedge-shaped stop member 60' clamped onto the cable 16' at a position preferably beneath the vehicle floor 130 preferably alongside the driver's seat position. When the system 10' is in the normal out-of-the-way position, this stop member 60' is disposed against an inclined ramp surface 63' of a spring-loaded locking arm 64' anchored to the vehicle floor 130 and including a handle 131 protruding into the passenger compartment. When the cable 16' is drawn to the restraining position, as shown in dotted lines in FIG. 19, the wedge-shaped stop member 60' is moved past the lock arm 64' for abutting engagement with a stop face 67' thereon which prevents return movement of the system to the normal position. However, the system 10' is quickly and easily restored to the original normal position by manually pulling the control handle 131 in the direction of arrow 68' to permit the cable tension spring 28' to return the system to the normal position ready for reuse.

A variety of further modifications and improvements to the passenger restraint system described herein are believed to be apparent to those skilled in the art. Accordingly, no limitation on the invention is intended by way of the description herein, except as set forth in the appended claims.

What is claimed is:

1. A passenger restraint system for restraining a passenger in a seat within a vehicle in the event of a collision, said restraint system comprising:
    a flexible sheetlike passenger restraint;
    a hinged frame carrying said passenger restraint and mounted on said vehicle generally over the passenger seat and movable between a normal out-of-the-way position and a descended restraining position pivoted downwardly from said normal position to place said passenger restraint generally in front of the passenger in the underlying seat;
    means for moving said hinged frame from said normal position to said restraining position in the event of a collision, said hinged frame moving means comprising a plunger member at a front end of the vehicle for movement in response to a collision at the vehicle front end, a cable having one end connected to and movable with said plunger member and an opposite end coupled to the vehicle generally adjacent said hinged frame, spring means for maintaining said cable taut, a slide actuator mounted on and movable with said cable, and cam means interengageable between said slide actuator and said hinged frame for moving said hinged frame between said normal position and said restraining position, said spring means biasing said cable for moving said slide actuator to urge said hinged frame toward said normal position; and
    means for releasably retaining said hinged frame in said restraining position against return movement to said normal position.

2. The passenger restraint system of claim 1 wherein said passenger restraint is formed from a flexible fabric material.

3. The passenger restraint system of claim 1 wherein said passenger restraint is formed from a flexible netting.

4. The passenger restraint system of claim 1 further including at least one headrest, a second hinged frame pivotally mounting said headrest for movement between a normal out-of-the-way position and a restraining position at the top of the passenger seat, means for moving said second hinged frame from said normal position to said restraining position in the event of a collision at the rear end of the vehicle, and means for releasably retaining said second hinged frame in said restraining position against return movement to said normal position.

5. The passenger restraint system of claim 1 wherein said passenger restraint includes foam padding material.

6. The passenger restraint system of claim 1 wherein said hinged frame includes a laterally spaced pair of hinged units each including a stationary hinge arm and a movable hinge arm pivoted with respect to said stationary arm for movement between said normal and restraining positions, said movable hinge arms of said hinged units having said passenger restraint supported therefrom, said cam means comprising cam slots formed in said stationary and movable hinge arms of one of said hinged units and cam rollers carried by said slide actuator and received into said cam slots.

7. The passenger restraint system of claim 1 wherein said retaining means comprises a lock member on said cable and movable therewith, and a spring-loaded lock arm for engaging and holding said lock member when said cable is displaced by said plunger in response to a collision, said lock arm being manually disengageable from said lock member to permit return movement of said cable and said plunger under the influence of said spring means.

8. A passenger restraint system for restraining a passenger in a seat within a vehicle in the event of a collision, said restraint system comprising:

restraining means mounted on the vehicle for movement between a normal out-of-the-way position and a restraining position for restraining the passenger within the seat, said restraining means including a hinged frame having a stationary frame arm mounted on the vehilce and a movable frame arm movable between the normal and restraining positions, and a passenger restraint carried by said movable hinge arm; and means for moving said movable hinge arm from said normal position to said restraining position in the event of a collision, said hinged frame moving means comprising a plunger member at one end of the vehicle for movement in response to a collision at said vehicle one end, a cable having one end connected to and movable with said plunger member and an opposite end coupled to the vehicle generally adjacent said hinged frame, spring means for maintaining said cable taut, actuator means mounted on and movable with said cable, and means interengageable between said actuator means and said hinged frame for moving said hinged frame between said normal position and said restraining position, said spring means biasing said cable for moving said actuator means to urge said hinged frame toward said normal position 9. The passenger restraint system of claim 8 wherein said stationary hinge arm is mounted on the vehicle above the passenger seat, and wherein said passenger restraint comprises a flexible sheet, said plunger member being mounted at the front end of the vehicle for movement in response to a collision at the vehicle front end.

10. The passenger restraint system of claim 8 wherein said movable hinge arm is mounted generally at the top of the passenger seat, and wherein said passenger restraint comprises a headrest, said plunger member being mounted at the rear end of the vehicle for movement in response to a collision at the vehicle rear end.

11. A passenger restraint system for restraining passengers within front and rear seats within a vehicle in the event of a collision, said restraint system comprising:

a first hinged frame and a second hinged frame mounted on the vehicle generally over the front and rear seats, respectively;

first and second flexible sheetlike passenger restraints carried respectively by said first and second hinged frames;

said first and second hinged frames being movable between normal out-of-the-way positions and descended restraining positions for respectively restraining passengers within the front and rear seats;

means for moving said first and second hinged frames from said normal positions to said restraining positions in the event of a collision at a front end of the vehicle, said hinged frame moving means comprising a plunger member at a front end of the vehicle for movement in response to a collision at the vehicle front end, a cable having one end connected to and movable with said plunger member and an opposite end coupled to the vehicle generally adjacent said first and second hinged frames, spring means for maintaining said cable taut, a pair of slide actuators mounted on and movable with said cable, and cam means interengageable between said slide actuators and said first and second hinged frames, respectively, for moving said first and second hinged frames between said normal positions and said restraining positions, said spring means biasing said cable for moving said slide actuators to urge said first and second hinged frames toward said normal positions; and means for releasably retaining said first and second hinged frames in restraining positions against return movement to said normal positions.

12. The passenger restraining system of claim 11 further including at least one headrest, a third hinged frame pivotally mounting said headrest for movement between a normal out-of-the-way position and a restraining position at the top of the passenger seat, means for moving said third hinged frame from said normal position to said restraining position in the event of a collision at the rear end of the vehicle, and means for releasably retaining said third hinged frame in said restraining position against return movement to said normal position.

13. The passenger restraint system of claim 11 wherein each of said first and second hinged frame includes a laterally spaced pair of hinged units each including a stationary hinge arm and a movable hinge arm pivoted with respect to said stationary arm for movement between said normal and restraining positions, said movable hinge arms of said hinged units having one of said passenger restraints supported therefrom, said cam means comprising cam slots formed in said stationary and movable hinge arms of one of said hinged units and cam rollers carried by said slide actuator and received into said cam slots.

14. The passenger restraint system of claim 11 wherein said retaining means comprises a lock member on said cable and movable therewith, and a spring-loaded lock arm for engaging and holding said lock member when said cable is displaced by said plunger in response to a collision, said lock arm being manually disengageable from said lock member to permit return movement of said cable and said plunger under the influence of said spring means.

15. The passenger restraint system of claim 11 wherein said passenger restraints are formed from a flexible fabric material.

* * * * *